(12) United States Patent  (10) Patent No.: US 8,262,262 B2
Mahaffey  (45) Date of Patent: Sep. 11, 2012

(54) GOBO RETAINING SPRING SYSTEM

(75) Inventor: Russell Mahaffey, Highland Village, TX (US)

(73) Assignee: Production Resource Group, LLC, New Windsor, NY (US)

( * ) Notice: Subject to any disclaimer, the term of this patent is extended or adjusted under 35 U.S.C. 154(b) by 195 days.

(21) Appl. No.: 12/493,630

(22) Filed: Jun. 29, 2009

(65) Prior Publication Data

US 2009/0323355 A1 Dec. 31, 2009

Related U.S. Application Data

(60) Provisional application No. 61/076,732, filed on Jun. 30, 2008, provisional application No. 61/141,625, filed on Dec. 30, 2008.

(51) Int. Cl.
*F21V 17/02* (2006.01)

(52) U.S. Cl. ........ 362/322; 362/282; 362/283; 362/293; 362/324; 359/889

(58) Field of Classification Search ............... 362/277, 362/282, 283, 293, 319, 322, 324; 359/813, 359/814, 889, 892
See application file for complete search history.

(56) References Cited

U.S. PATENT DOCUMENTS 7,370,990 B2 * 5/2008 Juřík .............................. 362/282
7,703,948 B2 * 4/2010 Dalsgaard ..................... 362/319

* cited by examiner

*Primary Examiner* — Stephen F Husar
(74) *Attorney, Agent, or Firm* — Law Office of Scott C. Harris, Inc.

(57) ABSTRACT

Gobo wheel assembly has multiple gobo devices on a rotatable wheel. A central sun gear can rotate all the gobos. The gobos can be inserted and released from the wheel assembly.

13 Claims, 6 Drawing Sheets

GOBO RETAINING SPRING SYSTEM

This application claims priority from provisional application Ser. No. 61/076,732, filed Jun. 30, 2008, and from 61/141,625, filed Dec. 30, 2008, the entire contents of both of which are herewith incorporated by reference.

BACKGROUND

Stage lights often use a rotatable gobo wheel assembly, with different wheels, each of which are individually rotatable, such as that described in U.S. Pat. No. 6,601,973.

DETAILED DESCRIPTION

A first exemplary embodiment shows a special kind of gobo holder assembly with a clip that operates in a different way than the previous devices. The gobo retainer of this embodiment holds a gobo using no second flange as in U.S. Pat. No. 6,601,973. Instead, a spring retainer holds against a side race portion of the gobo wheel in place.

The assembly including the Spring retainer extends preferably around more than 180 degrees of the gobo, so the gobo cannot fall out of the spring retainer. In order to insert or remove a gobo wheel, one simply presses the gobo into place against the force of the spring retainer. The gobo wheel is forced into the space, and held by the springs.

Figure 1:
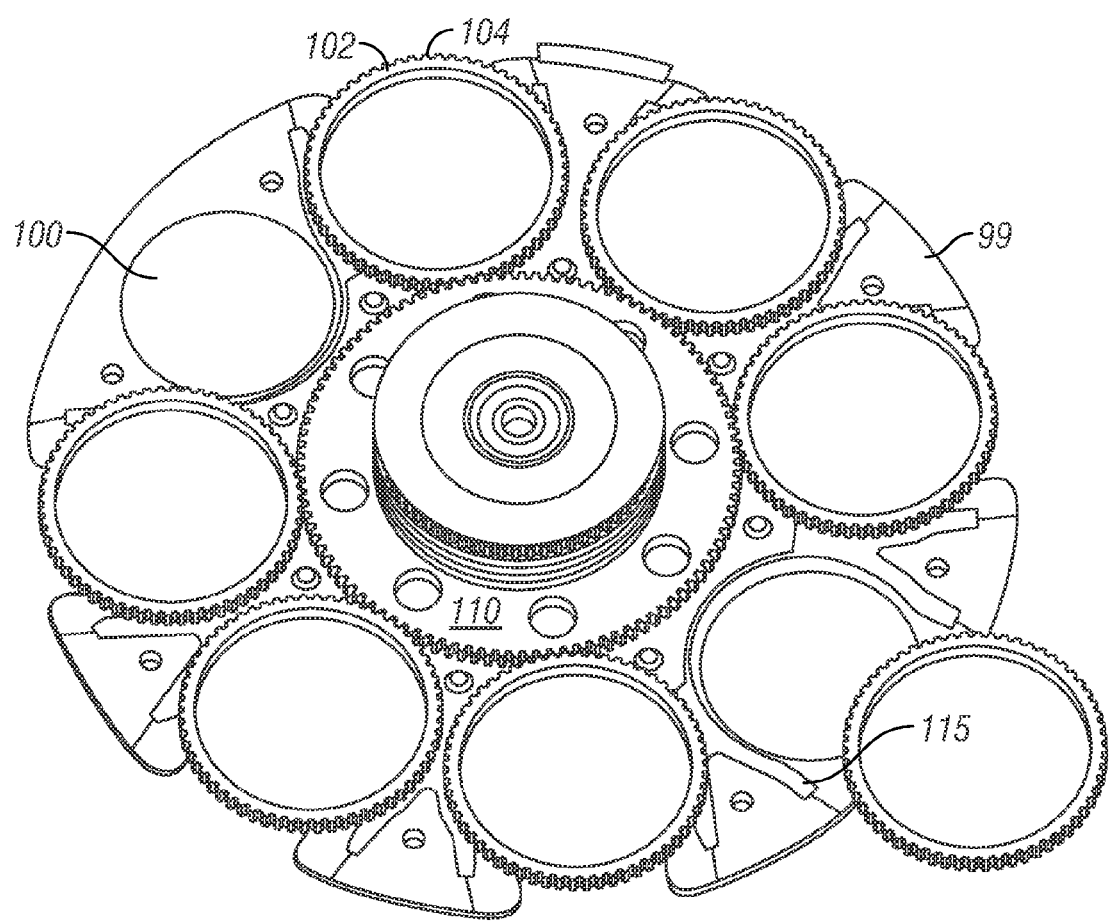
FIG. 1 shows a rotatable gobo wheel.

FIG. 1, a flat wheel 99 has openings therein such as 100. The openings each include a flange on which the gobo rests. The flange 102 holds the bottom surface of the gobo wheel.

Figure 2:
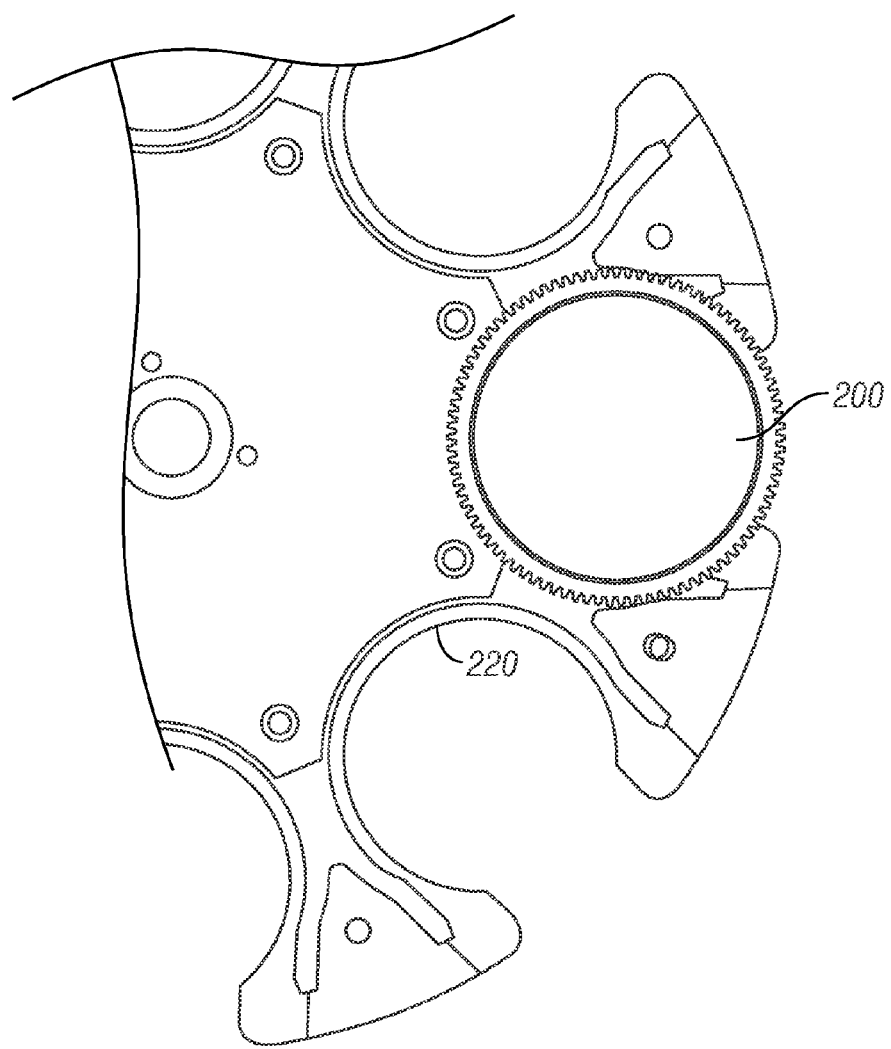
FIG. 2 shows an overhead view of the gobo wheel.

FIG. 2 shows how the gobo wheel 200 has its bottom surface 212 that rests on the flange 220 within the gobo wheel. In addition to the gobo wheel surface resting on the flange 220, external gears 104 on the outer surface of the gobo intersect with a central sun gear 110 and are held against the sun gear by the spring action of the spring 115.

Figure 3:
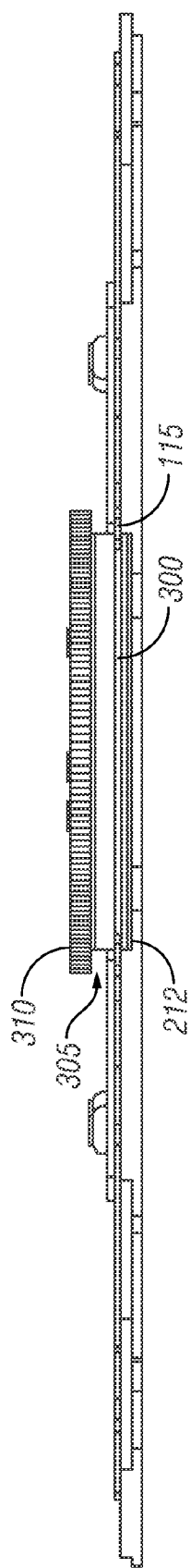
FIG. 3 shows how the gobo wheel is held by the springs.
Figure 4:
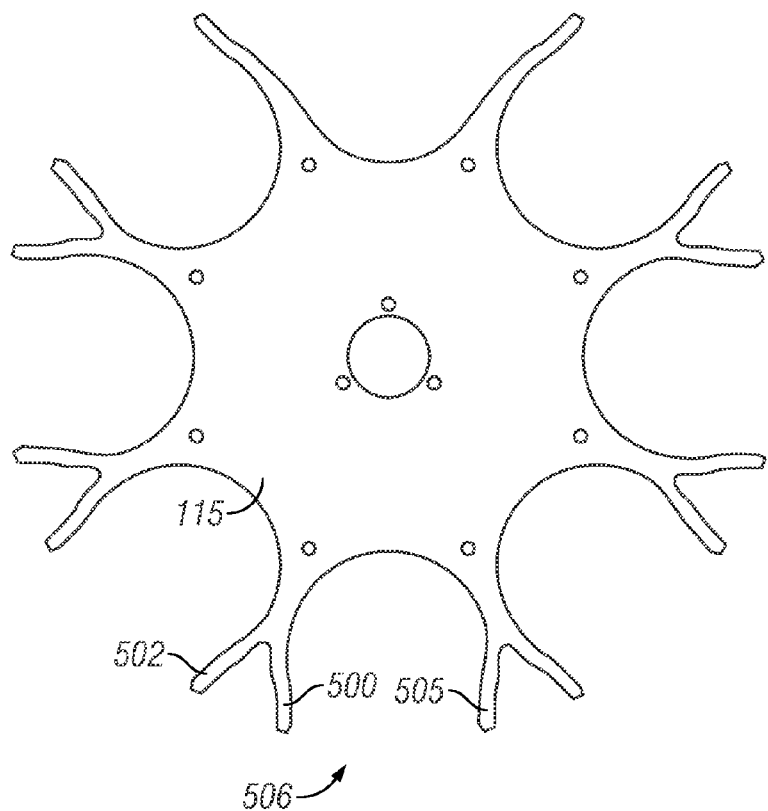
FIG. 4 shows the side view of the gobo wheel.
Figure 5:
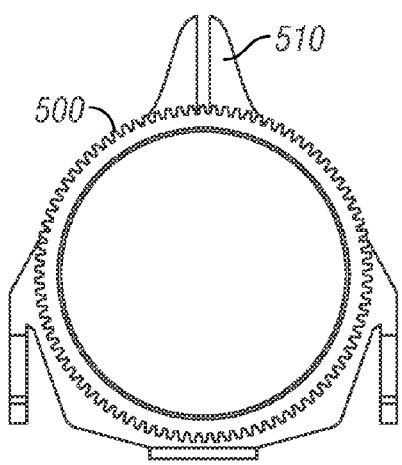
FIG. 5 shows the gobo holder assembly with its spring arms.

The spring retainer 115 is mounted above the bottom surface as shown in FIGS. 1-3. FIG. 3 shows hold the spring 115 holds a side race portion 300 of the gobo wheel in place. A drawing of the spring retainer is shown in FIG. 4. The figure shows how the spring retainer extends preferably around more than 180 degrees of the gobo, so the gobo cannot fallout of the spring retainer. However, to insert or remove a gobo wheel, the arms 500, 505 of the spring retainer can be forced open by the force of the spring, and the gobo wheel placed in the opening 506 caused by the opening between the spring tips 502.

Once the wheel is in place, the bottom plate with the flange 102 holds the gobo wheel in place in a direction perpendicular to the surface of the gobo wheel. The spring holds the gobo wheel in place in the direction parallel to the surface of the gobo wheel. Accordingly, the gobo is held in both directions. In the embodiment, the outer race 300 of the gobo, and the entire lower portion 305 does not rotate—but the upper portion 310 rotates relative to the lower portion 305. The spring 115 also holds the gobo wheel so that the outer gears 104 on the outer surface press against the gears of the central Sun gear 110. This allows rapid insertion and withdrawal of the gobo, and also allows all the gobos to be commonly rotated.

A second embodiment of this gobo holder assembly is shown in FIGS. 5-8C.

Figure 6:
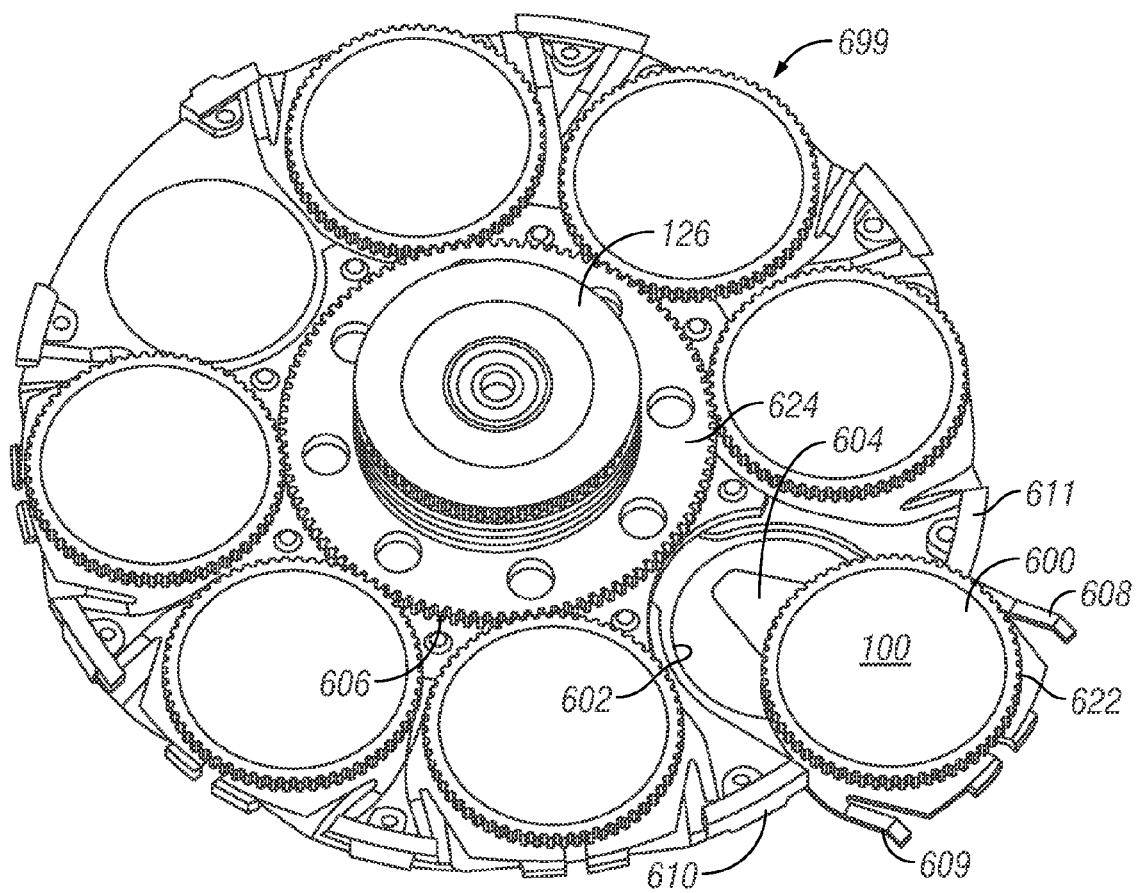
FIG. 6 shows a gobo wheel assembly of a second embodiment.

FIG. 6 shows a gobo 600 is radially inserted into a corresponding area 602 of a gobo wheel 699. The gobo is radially inserted into the spot 602 and removed from the spot 602. Each clip has a tongue area 604 which engages with a corresponding pocket 606 in the center of the wheel.

As in the first embodiment, the gobo assembly includes two parts, including an unmovable attachment part which has a spring part thereon. This unmovable attachment part is shown as 650, with the spring 609. There is also a movable gobo assembly 620, 622. In this embodiment, there is also a tongue 604 that is part of the unmovable part, and helps to align the device 600 to the rotatable wheel 699 the attachment to do with a fixed wheel.

A second embodiment of the gobo wheel 500 uses a split tongue part 510 which can be used in place of the gobo wheel 600 in the first embodiment.

The clip also has fingers 608, 609 that engage into corresponding surfaces 610, 611 on the outside of the wheel. The tongue 604 guides the assembly into place and holds it in the right location so that that the spring-held fingers latch with the surfaces to hold the assembly in place. Finger 609 latches with surface 610; finger 108 latches with surface 611. As in the first embodiment, the spring holds the gobo wheel in place. The gobo wheel, however, can be pulled out of its attached location against the spring force.

Each of the gobo assemblies such as 600 includes a gobo part 620 with a toothed outer section 622. The toothed outer section 622 engages a central sun gear 624 that is driven by a motor driven part 626 e.g. driven by a pulley.

Figure 7:
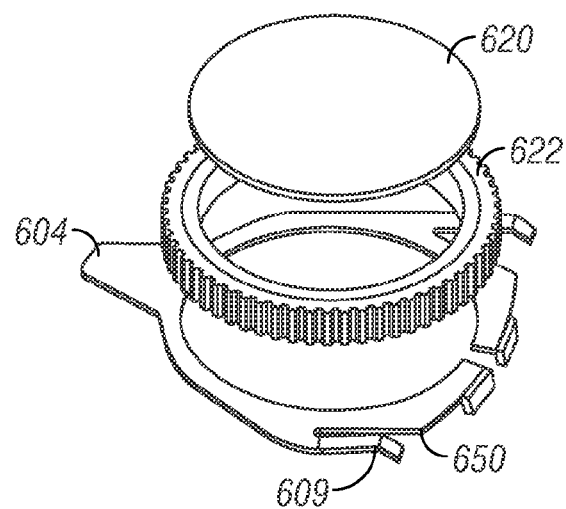
FIG. 7 shows an exploded view of the gobo wheel.
Figure 8A:
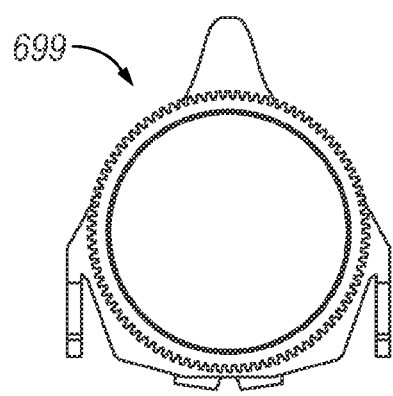
FIGS. 8A-8C show different faced views of the gobo wheel.
Figure 8B:
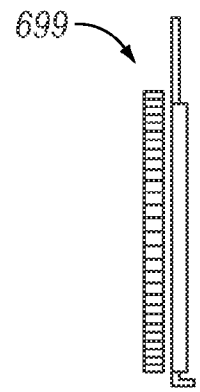
Figure 8C:
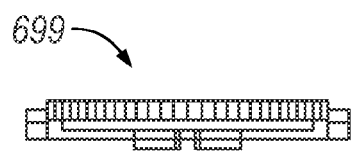

FIG. 7 shows an exploded view of the gobo assembly showing the gobo itself 720, the wheel portion 722, as well as the gobo holder 750 with the fingers and tongue. FIGS. 8A-8C show the gobo wheel 699 from the various directions. FIG. 8A shows the gobo wheel from its front-on position, while FIG. 8B shows a side view of that gobo wheel. FIG. 8C shows an end on view of the device.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other materials and spring forms can be used.

An intended use of a gobo wheel is in a remotely-controlled stage lighting device, having a controller that controls the functions of the light. The controller communicates to a remote controller that can control multiple different stage lighting devices collectively forming a lighting show.

In one or more exemplary embodiments, the functions described may be implemented in hardware, software, firmware, or any combination thereof by the light controller. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A gobo wheel assembly, comprising:
   a gobo wheel, having a plurality of gobo wheel holding parts, which each are spaced from one another, and which each hold gobos, forming a plurality of different surfaces for holding a plurality of different gobos, said gobo wheel having a toothed outer wheel which is rotatable; and
   a gobo holding part, holding a gobo, and having first and second movable spring parts which are movable and are attached to said gobo holding part, and having surfaces which each fit in said gobo wheel holding parts on said gobo wheel and are insertable and removable from said gobo wheel, said first and second movable spring parts holding said gobo into one of said surfaces on said gobo wheel, where said first and second spring holding parts respectively hold first and second sides of said gobo holding parts into said gobo wheel holding part, but do not extend completely around said gobo holding part, wherein said first and second spring holding parts are coupled to a movable toothed outer wheel part of said gobo holding part, which when said spring holding parts are inserted, presses the toothed outer wheel of said gobo holding part against the toothed outer wheel of said gobo wheel, and allows said gobo wheel to rotate when said toothed outer wheel of said gobo wheel rotates, and without rotating said spring parts.

2. An assembly as in claim 1, wherein said spring parts receive surfaces of said gobo which presses apart said spring are opened to remove the spring force and to separate said gobo assembly from said gobo holding assembly.

3. An assembly as in claim 1, further comprising an extending tongue part, which extends from said gobo holding part into a corresponding slot on said gobo wheel assembly.

4. An assembly as in claim 1, wherein said spring parts are coupled to said gobo wheel assembly.

5. An assembly as in claim 1, wherein said spring parts are separated to make more distance between said spring parts by an amount that allows a wheel to be inserted therein.

6. An assembly as in claim 1, wherein said spring parts surround first and second opposite sides of said wheel assembly, and surround said wheel assembly by more than 180 degrees.

7. A method of holding and removing gobos from a holder, comprising:
   moving first and second spring parts on a gobo holding wheel against their spring force;
   while holding said first and second spring parts against said spring force, removing a gobo holder from said gobo holding wheel that was held by said first and second spring parts;
   inserting a new gobo holder on said gobo holding wheel while holding said first and second spring parts against said spring force; and
   using said spring parts to hold an unmovable part of said new gobo wheel, at two surfaces of said new gobo wheel; and
   rotating a moving part of said new gobo wheel while said unmovable part is held to said gobo holding wheel and said unmovable part does not rotate while said moving part rotates.

8. A method as in claim 7, wherein said moving said spring parts comprises depressing said spring parts towards a top surface of said gobo holding wheel.

9. A method as in claim 8, further comprising extending a tongue part from said gobo holding assembly into a corresponding slot on said gobo wheel assembly.

10. A method as in claim 7, wherein said spring parts are separated to make more distance between said spring parts by a surface of said gobo pressing thereagainst.

11. A method as in claim 10, wherein said spring parts surround first and second opposite sides of said wheel assembly, and surround said wheel assembly by more than 180.degree.

12. A method as in claim 7, further comprising holding said gobo holder into place using a second spring.

13. A method as in claim 7, wherein said moving said spring parts comprises pressing said first and second spring parts towards a surface of the gobo holding wheel.

* * * * *